United States Patent [19]

Yamazaki

[11] 4,150,545
[45] Apr. 24, 1979

[54] SUPERCHARGED ENGINE HAVING MAIN AND AUXILIARY COMBUSTION CHAMBERS

[75] Inventor: Shuichi Yamazaki, Kamifukuoka, Japan

[73] Assignee: Honda Giken Kogyo Kabushiki Kaisha, Tokyo, Japan

[21] Appl. No.: 855,321

[22] Filed: Nov. 28, 1977

[30] Foreign Application Priority Data

Dec. 10, 1976 [JP] Japan .................................. 51-147825

[51] Int. Cl.² .......................... F02B 33/44; F02B 75/02
[52] U.S. Cl. ..................... 60/611; 123/75 B; 123/119 C
[58] Field of Search .......... 123/75 B, 119 C, 119 CE; 60/600, 601, 611

[56] References Cited

U.S. PATENT DOCUMENTS

| | | | |
|---|---|---|---|
| 1,896,163 | 2/1933 | Champion, Jr. | 123/75 B |
| 2,240,088 | 4/1941 | Birkigt | 123/75 B |
| 2,297,235 | 9/1942 | Muller | 60/600 |
| 3,049,865 | 8/1962 | Drayer | 60/601 |
| 3,491,733 | 1/1970 | Soubis | 123/75 B |
| 3,916,847 | 11/1975 | Nakano et al. | 123/75 B |
| 3,964,451 | 6/1976 | Goto | 123/75 B |

*Primary Examiner*—Charles J. Myhre
*Assistant Examiner*—David D. Reynolds
*Attorney, Agent, or Firm*—Lyon & Lyon

[57] ABSTRACT

An internal combustion engine having a main combustion chamber and an auxiliary combustion chamber connected by a torch opening has a first carburetor for supplying a lean mixture to the main combustion chamber and a second carburetor for supplying a rich mixture to the auxiliary combustion chamber. A turbo supercharger is operatively positioned between the first carburetor and the main combustion chamber. When the engine is operating under low load, the lean mixture is bypassed around the supercharger. When the engine is operating under high load, all of the lean mixture passes through the supercharger and a second bypass is opened so that the supercharged lean mixture is delivered to both combustion chambers.

6 Claims, 1 Drawing Figure

U.S. Patent    Apr. 24, 1979    4,150,545
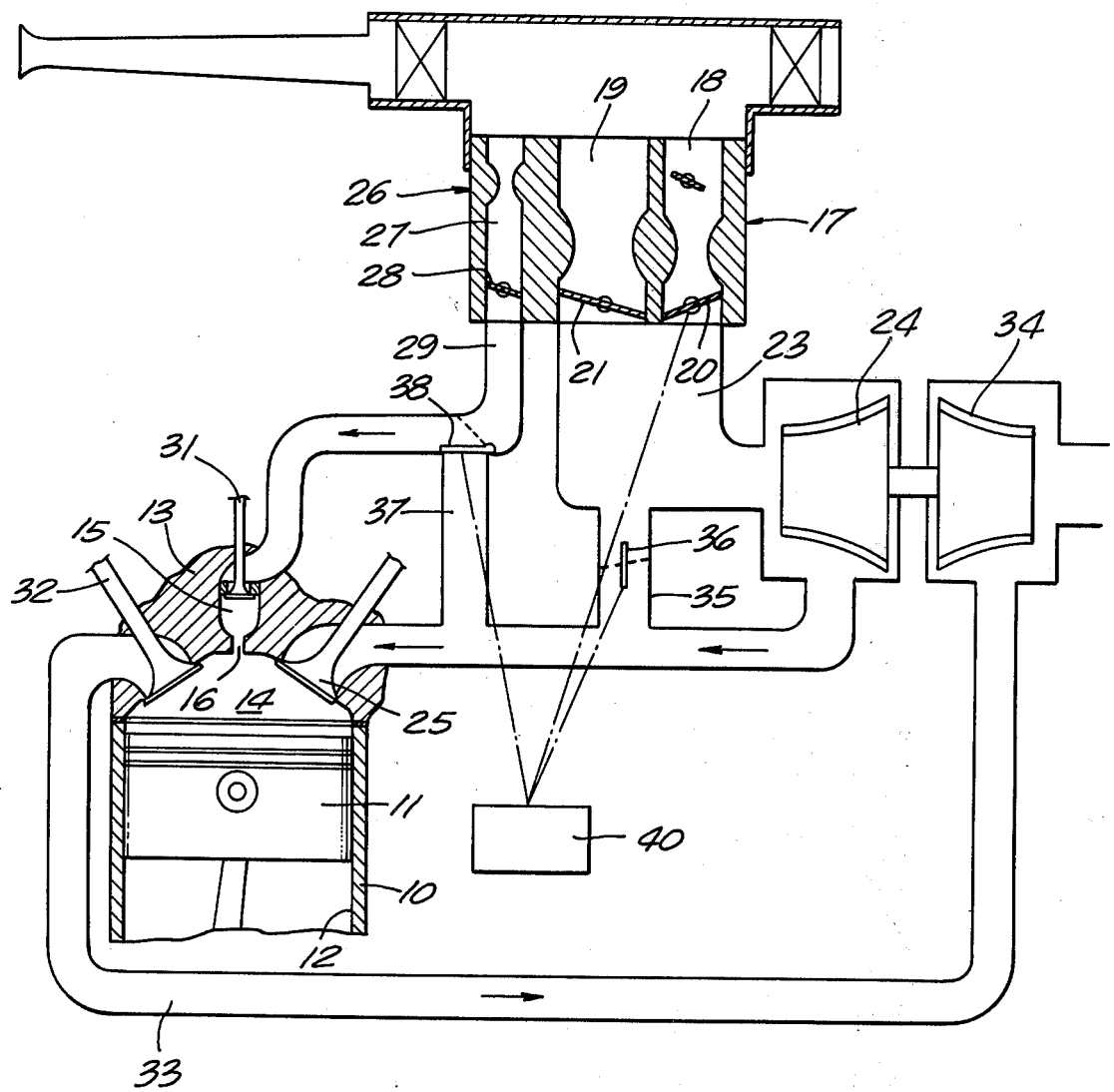

SUPERCHARGED ENGINE HAVING MAIN AND AUXILIARY COMBUSTION CHAMBERS

This invention relates to internal combustion piston engines having a main combustion chamber and an auxiliary combustion chamber connected by a torch opening. A first carburetor supplies a lean mixture to the main combustion chamber and a second carburetor supplies a rich mixture to the auxiliary combustion chamber. After compression, the mixture in the auxiliary chamber is ignited thereby causing a flame to project through the torch opening to ignite the lean mixture in the main combustion chamber.

It has previously been proposed to install a supercharger in the main intake passage connecting the first carburetor to the main combustion chamber. However, it has been found that when the engine is operating under low load the supercharger increases the flow resistance in the main intake passage with the result that the supercharger causes a power loss.

It is an object of this invention to avoid this difficulty and to provide a supercharger for an engine of the type described in which the lean intake mixture is bypassed around the supercharger when the engine is operating under low load, and which directs all of the lean mixture through the supercharger when the engine is operating under high load. In addition, when the engine is operating under high load, the compressed lean mixture downstream from the supercharger is directed into both combustion chambers, the rich mixture from the second carburetor being blocked off.

Another object is to provide a method of operating an internal combustion engine of the type described so that during low power output of the engine the lean mixture is bypassed around the supercharger and at high power output of the engine the lean mixture is compressed by the supercharger and is delivered to both the combustion chambers, the flow of rich mixture from the second carburetor being blocked off.

Other and more detailed objects and advantages will appear hereinafter.

The drawing is a schematic diagram partly in vertical section and showing a preferred embodiment of this invention.

Referring to the drawing, the engine generally designated 10 has at least one piston 11 sliding in a cylinder 12 and cooperating with the engine head 13 to form a main combustion chamber 14. An auxiliary combustion chamber 15 is also formed in the engine head 13, and the two combustion chambers are connected by a torch opening 16.

A first carburetor 17 has a main primary barrel 18 and a main secondary barrel 19, each provided with a throttle valve 20,21, respectively. Both of the barrels 18 and 19 discharge into a main intake passage 23. A rotary supercharger 24 is interposed in the main intake passage 23 which communicates with the main combustion chamber 14 through the main intake valve 25.

A second carburetor 26 has a single barrel 27 provided with a throttle valve 28 and communicating with the auxiliary intake passage 29. A rich mixture from the second carburetor 26 passes through the auxiliary intake passage 29 and through the auxiliary intake valve 31 into the auxiliary combustion chamber 15.

In the general plan of operation, the suction stroke of the piston 11 causes lean mixture to be drawn into the main combustion chamber 14 and rich mixture to be drawn into the auxiliary combustion chamber 15. After the compression stroke of the piston 11, the mixture in the auxiliary combustion chamber is ignited by a spark plug (not shown), thereby causing a torch flame to project through the torch opening 16 to ignite the lean mixture in the main combustion chamber 14. Subsequently, the exhaust valve 32 opens to permit hot exhaust gases to pass through the exhaust passage 33 to the turbine 34 which is connected to drive the rotary supercharger 24.

In accordance with this invention, a first bypass passage 35 is provided to permit lean mixture in the main intake passage to pass directly from the first carburetor 17 through the intake valve 25 and into the main combustion chamber 14. A first bypass valve 36 is positioned in the bypass passage 35. A second bypass passage 37 extends between the main intake passage 23 and the auxiliary intake passage 29. A second bypass valve 38 is provided at the junction of the passages 37 and 29. In one position this valve 38 closes the bypass passage 37 and opens the auxiliary intake passage 29. In another position, this valve 38 opens the bypass passage 37 into the auxiliary intake passage 29 and at the same time blocks off the passage 29 upstream from the valve 38.

A selector 40 is responsive to the power output of the engine and is connected to operate the first bypass valve 36 and the second bypass valve 38. When the engine power output is low, the first bypass valve 36 is opened and the second bypass valve 38 closes the second bypass passage 37 and opens the auxiliary intake passage 29. The flow of lean mixture from the first carburetor 17 then passes through the bypass passage 35 and through the intake valve 25 into the main combustion chamber 14. At the same time the flow of rich mixture from the second carburetor 26 passes through the open auxiliary intake passage and into the auxiliary combustion chamber 15. When the power output of the engine is high, the selector 40 closes the bypass valve 36 so that all of the lean mixture from the first carburetor must pass through the rotary supercharger 24. The selector 40 opens the second bypass valve 38 and moves it to a position to block off flow of rich mixture from the second carburetor 26. The second bypass passage 37 thus carries lean mixture from the main intake passage 23 into the auxiliary combustion chamber 15 through the auxiliary inlet valve 31. Thus, under high power output of the engine, the lean mixture from the first carburetor is directed to both the main combustion chamber 14 and the auxiliary combustion chamber 15.

The selector 40 may be made responsive to the power output of the engine in one of several ways. For example, the selector 40 may be connected directly to the throttle valve 20 in the main primary barrel 18 of the first carburetor 17. Another way to make the selector responsive to power output of the engine is to connect it to the engine intake vacuum downstream from one of the throttle valves 20 or 28.

Having fully described my invention, it is to be understood that I am not to be limited to the details of the invention herein set forth but that my invention is of the full scope of the appended claims.

I claim:

1. In an internal combustion piston engine having a main combustion chamber and an auxiliary combustion chamber connected by a torch opening, a first carburetor communicating with a main intake passage, a second carburetor communicating with an auxiliary intake passage, means connecting said main intake passage to said main combustion chamber, said means including a rotary supercharger, said means also including a first bypass passage around said supercharger, a second bypass passage connecting said main intake passage and said auxiliary intake passage, and means responsive to the power output of the engine and acting, when the output is low, to open the first bypass passage and to close the second bypass passage, said means acting, when the engine output is high, to close the first bypass passage and open the second bypass passage, whereby all of the mixture from the first carburetor must pass through the supercharger and whereby a part of that mixture is delivered to both of said combustion chambers.

2. In an internal combustion piston engine having a main combustion chamber and an auxiliary combustion chamber connected by a torch opening, a first carburetor communicating with a main intake passage, a second carburetor communicating with an auxiliary intake passage, means connecting said main intake passage to said main combustion chamber, said means including a rotary supercharger, said means also including a first bypass passage around said supercharger and provided with a first bypass valve, a second bypass passage connecting said main intake passage and said auxiliary intake passage and provided with a second bypass valve, and means responsive to the power output of the engine and acting, when the output is low, to open the first bypass valve and to close the second bypass valve, said means acting, when the engine output is high, to close the first bypass valve and open the second bypass valve, whereby all of the mixture from the first carburetor must pass through the supercharger and whereby a part of that mixture is delivered to both of said combustion chambers.

3. In an internal combustion piston engine having a main combustion chamber and an auxiliary combustion chamber connected by a torch opening, a first carburetor communicating with a main intake passage, a second carburetor communicating with an auxiliary intake passage, means connecting said main intake passage to said main combustion chamber, said means including a rotary supercharger, said means also including a first bypass passage bypassing said supercharger and provided with a first bypass valve, a second bypass passage connecting said main intake passage and said auxiliary intake passage and provided with a second bypass valve, said second bypass valve in a first position closing said second bypass passage while opening said auxiliary intake passage, said second bypass valve in a second position closing said auxiliary intake passage upstream from said second bypass valve and opening said second bypass passage, a turbine operated by exhaust gases and serving to drive said supercharger, a selector operatively connected to both of said bypass valves, the selector being responsive to low power output of the engine and acting on said bypass valves to open said first bypass passage and to close said second bypass passage, said selector being responsive to high power output of the engine to act on said bypass valves to close the first bypass passage, to open the second bypass passage and to close the auxiliary passage upstream from the second bypass valve, whereby all of the mixture from the first carburetor must pass through the supercharger and whereby a part of that mixture is delivered to both of said combustion chambers.

4. In an internal combustion piston engine having a main combustion chamber and an auxiliary combustion chamber connected by a torch opening, a first carburetor having a main primary barrel and a main secondary barrel, each communicating with a main intake passage, a second carburetor having a barrel communicating with an auxiliary intake passage, a throttle valve in each of said barrels, neans connecting said main intake passage to said main combustion chamber, said means including a rotary supercharger, said means also including a first bypass passage bypassing said supercharger and provided with a first bypass valve, a second bypass passage connecting said main intake passage and said auxiliary intake passage and provided with a second bypass valve, said second bypass valve in a first position closing said second bypass passage while opening said auxiliary intake passage, said second bypass valve in a second position closing said auxiliary intake passage upstream from said second bypass valve and opening said second bypass passage, a turbine operated by exhaust gases and serving to drive said supercharger, a selector operatively connected to both of said bypass valves, the selector being responsive to low power output of the engine and acting on said bypass valves to open said first bypass passage and to close said second bypass passage, said selector being responsive to high power output of the engine to act on said bypass valves to close the first bypass passage, to open the second bypass passage and to close the auxiliary passage upstream from the second bypass valve, whereby all of the mixture from the first carburetor must pass through the supercharger and whereby a part of that mixture is delivered to both of said combustion chambers.

5. In an internal combustion piston engine having a main combustion chamber and an auxiliary combustion chamber connected by a torch opening, a first carburetor having a main primary barrel and a main secondary barrel, each communicating with a main intake passage, a second carburetor having a barrel communicating with an auxiliary intake passage, a throttle valve in each of said barrels, means connecting said main intake passage to said main combustion chamber, said means including a rotary supercharger, said means also including a first bypass passage bypassing said supercharger and provided with a first bypass valve, a second bypass passage connecting said main intake passage and said auxiliary intake passage and provided with a second bypass valve, said second bypass valve in a first position closing said second bypass passage while opening said auxiliary intake passage, said second bypass valve in a second position closing said auxiliary intake passage upstream from said second bypass valve and opening said second bypass passage, a turbine operated by exhaust gases and serving to drive said supercharger, a selector operatively connected to both of said bypass valves, the selector being responsive to the position of the throttle valve in said main primary barrel of said first carburetor, said selector acting on said bypass valves to open said first bypass passage and to close said second bypass passage when the latter said throttle valve is only partially open, said selector acting on said bypass valves to close the first bypass passage, to open the second bypass passage and to close the auxiliary passage upstream from the second bypass valve when the latter said throttle valve is fully open, whereby all of the mixture from the first carburetor must pass through the supercharger and whereby a part of that mixture is delivered to both of said combustion chambers.

6. The method of operating an internal combustion engine having a main combustion chamber and an auxiliary combustion chamber connected by a torch opening, and having a first carburetor for supplying a lean mixture and a second carburetor for supplying a rich mixture, the steps comprising: on low power output of the engine directing the mixture from the first carburetor to the main combustion chamber and directing the mixture from the second carburetor to the auxiliary combustion chamber, and on high power output of the engine directing all of the mixture from the first carburetor through a turbo supercharger into both combustion chambers, and blocking off flow of mixture from said second carburetor.

* * * * *